(12) United States Patent
Rozman et al.

(10) Patent No.: US 8,816,650 B2
(45) Date of Patent: Aug. 26, 2014

(54) MODULATING CURRENT IN A DUAL GENERATOR SYSTEM

(71) Applicants: Gregory I. Rozman, Rockford, IL (US); Jacek F. Gieras, Glastonbury, CT (US); Steven J. Moss, Rockford, IL (US)

(72) Inventors: Gregory I. Rozman, Rockford, IL (US); Jacek F. Gieras, Glastonbury, CT (US); Steven J. Moss, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 94 days.

(21) Appl. No.: 13/680,851

(22) Filed: Nov. 19, 2012

(65) Prior Publication Data

US 2014/0139062 A1    May 22, 2014

(51) Int. Cl.
*H02P 11/00* (2006.01)

(52) U.S. Cl.
USPC .............................................. 322/17; 322/37

(58) Field of Classification Search
USPC ................................................. 322/17, 22, 37
See application file for complete search history.

(56) References Cited

U.S. PATENT DOCUMENTS

| | | | | |
|---|---|---|---|---|
| 4,347,473 A | * | 8/1982 | Stroud ........................... | 320/126 |
| 4,539,515 A | * | 9/1985 | Morishita et al. .............. | 320/123 |
| 4,829,228 A | * | 5/1989 | Buetemeister .................. | 322/27 |
| 5,254,936 A | * | 10/1993 | Leaf et al. ........................ | 322/90 |
| 5,739,676 A | * | 4/1998 | Judge et al. ...................... | 322/22 |
| 5,764,036 A | * | 6/1998 | Vaidya et al. .................... | 322/90 |
| 6,657,322 B2 | | 12/2003 | Skibinski et al. | |
| 7,002,317 B2 | * | 2/2006 | Ganev ............................ | 318/701 |
| 7,787,267 B2 | | 8/2010 | Wu et al. | |
| 8,004,119 B2 | | 8/2011 | Tsang et al. | |
| 2010/0295517 A1 | | 11/2010 | Rozman et al. | |

* cited by examiner

*Primary Examiner* — Nicholas Ponomarenko
(74) *Attorney, Agent, or Firm* — Cantor Colburn LLP

(57) ABSTRACT

A dual-generator assembly includes a first generator configured to generate a first current and a second generator configured to generate a second current modulated based on harmonic current in the first current.

18 Claims, 4 Drawing Sheets

MODULATING CURRENT IN A DUAL GENERATOR SYSTEM

BACKGROUND OF THE INVENTION

Embodiments of the present invention relate to a dual generator system, and in particular to a system having a primary wound field synchronous generator and an auxiliary flux regulated permanent magnet generator to improve a power output of the primary generator.

The increasing use of six-pulse rectifiers, switched power supplies and other non-liner loads may generate harmonic currents. Harmonic current pollutes a power system and may result in serious problems such as transformer overheat, degrading voltage quality, destruction of power components, etc. Conventional systems address harmonic current by providing passive or active filters. However, passive filters may cause undesired resonances. The active filter uses a parallel-connected voltage source inverter to produce harmonic components to cancel harmonic components from the non-linear load.

BRIEF DESCRIPTION OF THE INVENTION

Embodiments of the present invention relate to dual-generator assembly including a first generator configured to generate a first current and a second generator configured to generate a second current modulated based on harmonic current in the first current.

Embodiments of the present invention further relate to a method of compensating for harmonic current. The method includes generating a first current with a first generator and generating a second current with a second generator. The method further includes monitoring the second current and modulating the second current based on monitoring the second current to compensate for a harmonic characteristic in the first current.

BRIEF DESCRIPTION OF THE DRAWINGS

The following descriptions should not be considered limiting. With reference to the accompanying drawings, like elements are numbered alike.

DETAILED DESCRIPTION OF THE INVENTION

Conventional power generating systems use passive or active filters to address current harmonics. Embodiments of the present invention relate to a dual generator system that utilizes a flux regulated generator to supplement power provided to a load by a main generator and to reduce harmonic currents from the dual generator system.

Figure 1:
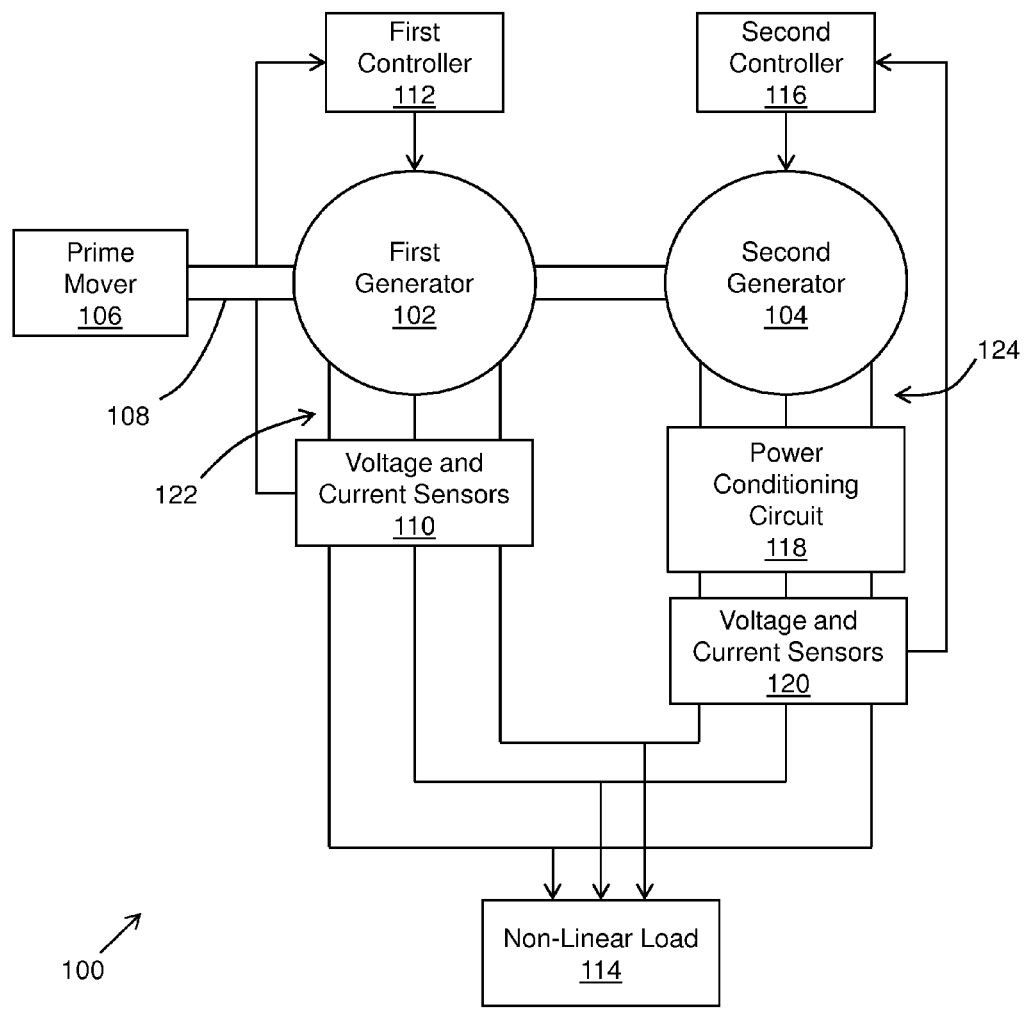
FIG. 1 is a dual generator system according to an embodiment of the present invention.

FIG. 1 illustrates a dual generator system 100 according to an embodiment of the invention. The system 100 includes a first generator 102 and a second generator 104. In one embodiment, the first generator is a wound field synchronous generator and the second generator is a flux regulated permanent magnet generator. In one embodiment, the first generator 102 is a main or primary generator and the second generator is an auxiliary generator configured, such that the first generator 102 is configured to supply a majority of power to a non-linear load 114 and the second generator 104 is configured to supply a minority of power to the non-linear load 114 and/or provide harmonic components to cancel harmonic components from the non-linear load 114. In one embodiment, the second generator includes three single-phase independently controlled flux regulated permanent magnet generators.

The first and second generators 102 and 104 each generate power based on rotation of a shaft 108 rotated by a prime mover 106. In one embodiment, the prime mover 106 is an internal combustion engine but, of course, any type of engine or generator can be used to rotate the shaft 108. The system 100 further includes voltage and current sensors 110 to detect voltage and current characteristics of the first generator 102 and a first controller 112 to control power generated by the first generator 102. The first generator 102 outputs power via multi-phase output lines 122. While FIG. 1 illustrates three multi-phase output lines 122, embodiments of the invention encompass any number of multi-phase output lines 122.

The system 100 further includes a power conditioning circuit 118 to receive power output from the second generator 104 via the multi-phase output lines 124, a power conditioning circuit 118 and voltage and current sensors 120 to monitor voltage and current of the multi-phase output lines 124. The system 100 also includes a second controller 116 that receives monitoring signals from the voltage and current sensors 120 and controls the second generator 104 based on the monitoring signals. In particular, the second controller 116 is configured to modulate a magnetic flux of a control winding in the second generator 104 based on the monitoring signals.

The multi-phase output lines 122 from the first generator 102 and the multi-phase output lines 124 from the second generator 104 are connected together and supply power to a non-linear load 114. In some instances, output of the first generator 102 is polluted by harmonic components from non-linear load. The voltage and current sensors 120 detect properties in the multi-phase lines 124 corresponding to the harmonic currents and a current output from the second generator 104 is modulated based on the detected characteristics. Accordingly, the current output from the second generator 104 is modulated to compensate for the harmonic currents induced by the non-linear load 114. When the current output from the second generator 104 is combined with the current output from the first generator 102, the modulation of the current from the second generator 104 compensates for the harmonic currents induced by the non-linear load 114.

According to embodiments of the present invention, the second generator 104 may both supply output power to a load 114 in combination with power output from the first generator 102, and the second generator 104 may also cancel harmonics in the current output from the first generator 102.

Figure 2:
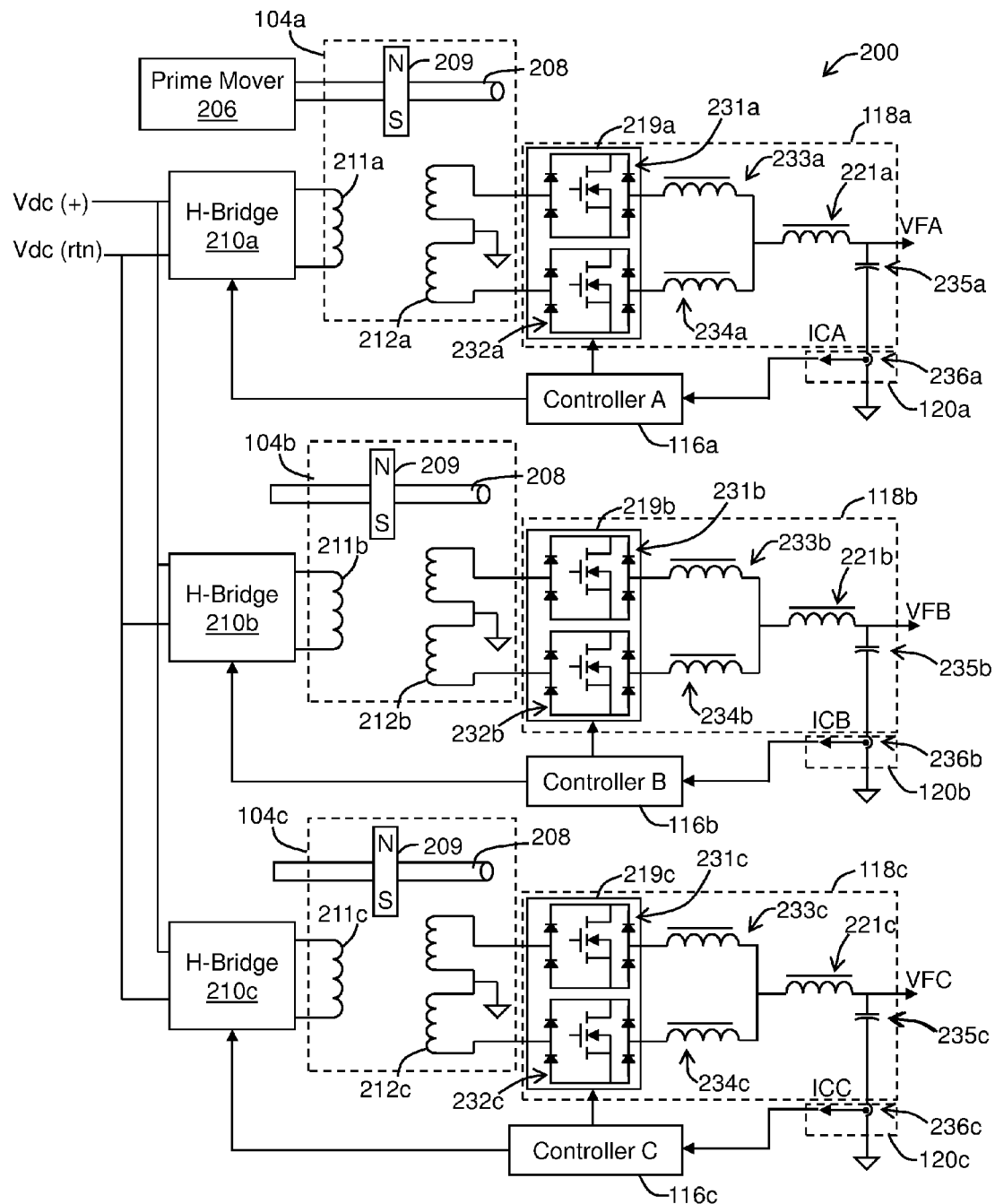
FIG. 2 illustrates a the dual generator system in additional detail according to an embodiment of the present invention.

FIG. 2 illustrates a generator assembly 200 according to one embodiment of the invention. The generator assembly 200 of FIG. 2 may correspond to the second generator 104 of FIG. 1, in combination with the conditioning units 120 and the current sensors 118, for example. The prime mover 206 may include an optional speed increaser (not shown). As illustrated, the generator assembly 200 includes multiple generator units 104a, 104b and 104c, multiple conditioning circuits 118a, 118b and 118c, and multiple voltage and current sensor units 120a, 120b and 120c, corresponding to multiple phases of the generator assembly 200. The generator units may have a large number of poles to achieve high-frequency alternating current. The generator units' frequency may be further increased by the optional speed increaser. The generator assembly 200 may also include multiple second controllers 116a, 116b and 116c, or the second controllers 116a, 116b and 116c may all be part of one controller 116 that controls power generation of each of the phases A, B and C of the generator assembly 200. Referring to the generator unit 104a, a stator 212a has a center-tapped single phase output with a center tap to provide a balanced single-phase high-frequency alternating current (HFAC) output from the stator 212a. The HFAC output is generated based on rotating the permanent magnet 209 and the shaft 208 by the prime mover 206.

The HFAC output from the stator 212a is supplied to the conditioning circuit 118a. As illustrated in FIG. 2, the conditioning circuit 118a may include a switching unit 219a and filters. In one embodiment, the switching unit 219a includes a first bi-directional switch 231a and a second bi-directional switch 232a. The filters include first and second commutating inductors 233a and 234a, an inductor 221a and a capacitor 235a that make up an LC filter. In embodiments of the present invention, the switching unit 219a receives the balanced single phase HFAC from the stator 212a and produces a desired single phase AC output having a desired frequency. The filtered single phase AC output, VFA, is output to a load, such as the non-linear load 114 of FIG. 1.

A voltage and current sensor unit 120a monitors at least one of voltage and current characteristics of the output power signal VFA. In FIG. 2, the voltage and current sensor unit 120a includes a current sensor 236a. The current sensor 236a detects a current level ICA and outputs the detected current level to the controller A 116a. The controller A 116a controls the switching unit 219a based on the monitored current. In addition, in embodiments of the invention, the controller A 116a controls a modulation of a magnetic flux in the generator unit 104a to modulate the balanced single phase high-frequency alternating current (HFAC) output from the stator 212a.

In particular, the controller 116a supplies a control signal to an H-Bridge 210a. The H-Bridge 210a receives an input DC voltage, Vdc and Vdc (rtn) from the combined generator 102 and generator 104 outputs after being rectified by a rectification unit (not shown), and the control signals from the controller A 116a and controls a current supplied to the control winding 211a based on the control signal from the controller A 116a. The control winding 211a generates a magnetic flux that modulates the balanced single phase HFAC from the stator 212a according to the control signals output by the controller A 116a. Accordingly, harmonic currents detected by the current sensor 236a may be reduced, compensated for or substantially eliminated by generating a flux with the control winding 211a to modulate the balanced single phase HFAC from the stator 212a.

Although an embodiment of the invention has been described with respect to one phase, phase A, of the generator assembly 200, any number of multiple phases may be generated. For example, FIG. 2 illustrates a three-phase generator assembly, and the configuration and operation of phase B and phase C are the same as phase A, and are not described in further detail. In other words, the generator assembly 200 further includes generator units 104b and 104c, conditioning circuits 118b and 118c, voltage and current units 120b and 120c and controllers 116b and 116c. The generator units 104b and 104c include H-bridges 210b and 210c and stators 212b and 212c. Each of the stators 212a, 212b and 212c may generate a balanced single phase HFAC based on rotation of the same permanent magnet 209.

The conditioning circuits 118b and 118c include switching units 219b and 219c, which include bi-directional switches 231b, 232b, 231c and 232c. The conditioning circuits 118b and 118c also include commutating inductors 233b, 234b, 233c and 234c, inductors 221b and 221c and capacitors 235b and 235c. The voltage and current sensor units 120b and 120c include current sensors 236b and 236c.

Figure 3:
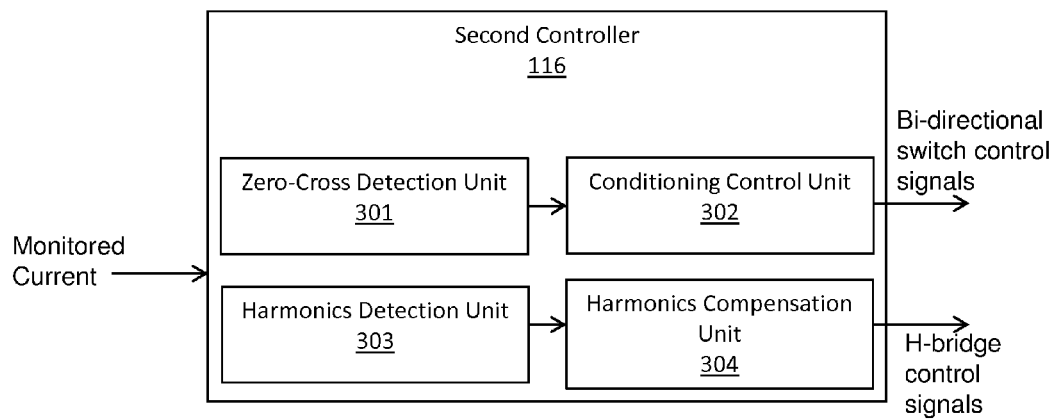
FIG. 3 is a block diagram of a control circuit according to one embodiment.

FIG. 3 illustrates one example of a second controller 116 according to one embodiment of the invention. The second controller 116 may correspond to each of the controllers A, B and C, 116a, 116b and 116c of FIG. 2. A monitored current, or a signal generated by a voltage or current sensor is supplied to the second controller 116. A zero-cross detection unit 301 detects a point where an AC signal crosses a zero value and generates a zero-cross signal and an inverted zero-cross signal. The zero-cross signal and inverted zero-cross signal are provided to a conditioning control unit 302. The conditioning control unit 302 generates switch control signals to control the turning on and off the switches of a switching unit, such as the switching units 219a, 219b and 219c of FIG. 2. For example, the switch control signals may be gate control signals to turn on and off the metal oxide silicon field effect transistors (MOSFETS) of the bi-directional switches 231a, 232a, 231b, 232b, 231c and 231c of FIG. 2.

The monitored current, or signals corresponding to the monitored current, is also supplied to a harmonics detection unit 303 to detect harmonic currents in the monitored current. Harmonics detection signals are provided from the harmonics detection unit 303 to a harmonics compensation unit 304. The harmonics compensation unit 304 generates control signals to control a magnetic flux provided to stators 212a, 212b and 212c of FIG. 2. For example, the harmonics compensation unit 304 may provide control signals to the H-bridges 210a, 210b and 210c to control current supplied to the control windings 211a, 211b and 211c. Accordingly, the second controller 116 may control conditioning of the current generated by the generator unit 104 as well as levels of harmonic-compensating flux to reduce, compensate or eliminate harmonics in a current supplied to a load.

Figure 4:
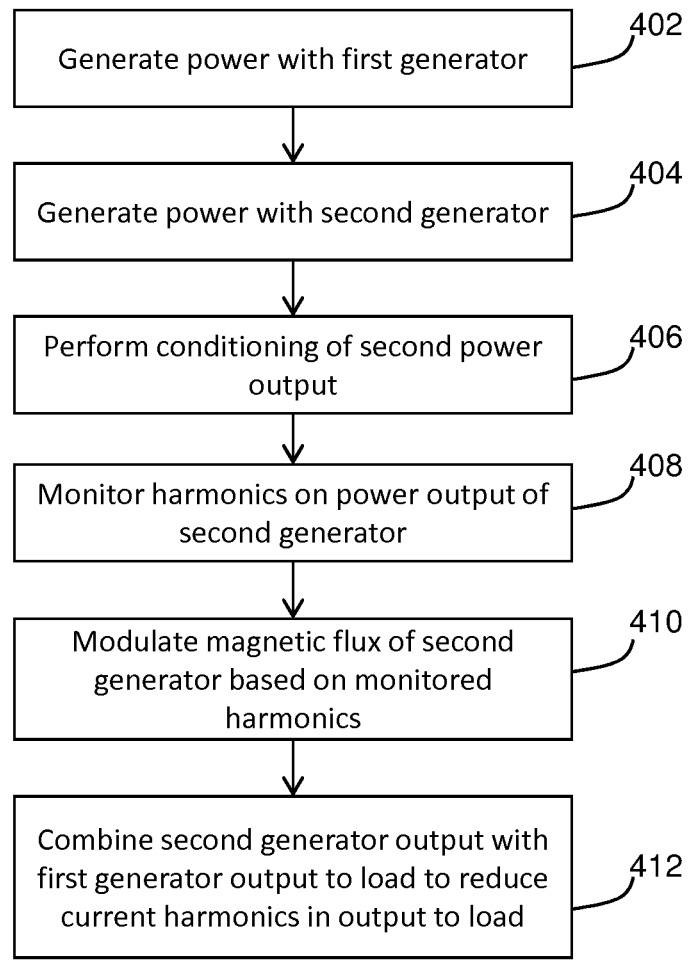
FIG. 4 is a flow diagram illustrating a method for controlling a retractable brush according to one embodiment of the invention.

FIG. 4 illustrates a flowchart of a method according to one embodiment. In block 402, power is generated with a first generator. The first generator may be a primary or main generator, and it may be a wound field synchronous generator. In block 404, power is generated with a second generator. The second generator may be an auxiliary generator, and it may be an integrated multiple single-phase independently-controlled flux-regulated permanent magnet generator. The first and second generators may each be multi-phase generators having a same number of phases. The first and second generators may generate power based on flux generated by one or more permanent magnets located on a same shaft rotated by a prime mover, such as an internal combustion engine. In one embodiment, the second generator may be connected to the prime mover via a speed increaser. In one embodiment, the first generator is configured to provide a majority of power to a load via power output lines and the second generator is configured to provide a minority of power to the load via the same power output lines simultaneously with the power output from the first generator.

In block 406, the power output by the second generator is conditioned, such as by controlling power and frequency levels of the output power. The power output may be conditioned with rectifier circuits, inductors and filters, for example. In block 408, harmonics of the output power lines are monitored. For example, one or both of voltage and current sensors may be provided on the multi-phase power output lines of the second generator. The second generator is connected in parallel with the first generator and provides compensating current harmonics.

In block 410, a magnetic flux applied to a stator of the second generator is modulated based on the monitored harmonics, or based on detected power characteristics corresponding to harmonics. The modulated magnetic flux is controlled to generate a current output from the second generator that is modulated to compensate for, or substantially eliminate, harmonics of the current output from the first generator. In other words, current generated by a current-generating stator of the second generator is based simultaneously on both a magnetic flux of a rotating permanent magnet and a modulated magnetic flux of a control winding.

In block 412, the power output from the second generator is combined with the power output from the first generator. In other words, the power generated by the second generator may be supplied to multi-phase output lines connected to multi-phase output lines of the first generator. The modulation of the current generated by the second generator based on detected current characteristics may compensate for, or substantially eliminate, harmonics from the non-linear load 114.

According to embodiments of the present invention, a first generator may generate power and supply the power to a load, such as a non-linear load. A second generator may generate power and may also supply the power to the load. The second generator may modulate a magnetic flux based on power characteristics, such as current harmonics. Accordingly, the modulated magnetic flux of the second generator may reduce, compensate or eliminate harmonics in power output to the load.

Embodiments of the present invention may be implemented in any application in which power is supplied to a load, and in particular to a non-linear load. Embodiments encompass any system in which a second generator modulates a magnetic flux to compensate for current characteristics of the non-linear load. Embodiments of the invention encompass stationary generators and mobile generating units.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A dual-generator assembly, comprising:
a first generator configured to generate a first current; and
a second generator configured to generate a second current modulated based on harmonics determined to be present in the first current.

2. The dual-generator assembly of claim 1, wherein the second generator is configured to modulate the second current by modulating a magnetic flux supplied to a current-generating stator of the second generator.

3. The dual-generator assembly of claim 1, wherein the first generator and the second generator output power via first power output lines and second output lines, respectively, the first output lines being connected to the second output lines, such that the first and second currents are combined and provided to a non-linear load.

4. The dual-generator assembly of claim 1, wherein the first generator comprises first multi-phase power output lines and the first current is output via the first multi-phase power output lines, and
the second generator comprises second multi-phase power output lines and the second current is output via the second multi-phase power output lines.

5. The dual-generator assembly of claim 1, wherein the first generator includes first multiple stators corresponding to the first multi-phase power output lines,
the second generator includes second multiple stators corresponding to the second multi-phase power output lines, and
a number of the first multiple stators is the same as a number of the second multiple stators.

6. The dual-generator assembly of claim 1, further comprising:
a prime mover configured to rotate a shaft having a permanent magnet thereon, the first and second generators configured to generate the first and second currents based on rotation of the shaft.

7. The dual-generator assembly of claim 1, wherein the second generator is a magnetic flux-regulated generator.

8. The dual-generator assembly of claim 7, wherein the second generator comprises:
multiple stators configured to generate current corresponding to the second multi-phase power output lines;
a current sensor configured to detect a current through the second multi-phase power output lines; and
a control winding configured to generate a flux to modulate a current generated by the multiple stators based on the current detected through the second multi-phase power output lines.

9. The dual-generator assembly of claim 1, wherein the second generator comprises:
a current generator configured to generate a current based on a rotating permanent magnet;
a power conditioning circuit configured to convert the generated current to the second current having a predetermined frequency;
a sensor circuit configured to monitor the second current; and
a control circuit configured to modulate the current generated by the current generator based on the monitoring of the second current.

10. The dual-generator assembly of claim 9, wherein the current generator includes an H-bridge circuit configured to supply a control current to a control winding, the control circuit configured to generate control signals to control current transmitted through the H-bridge circuit to the control winding and the control winding configured to generate a magnetic flux to modulate the current generated by the current generator.

11. The dual-generator assembly of claim 9, wherein the power conditioning circuit comprises:
a bi-directional switch connected to each end of a single-phase winding of the current generator; and
an inductor-capacitor filter connected to the bi-directional switch.

12. A method of compensating for harmonic current, comprising:
generating a first current with a first generator;
generating a second current with a second generator;
monitoring the second current; and
modulating the second current based on monitoring the second current to compensate for a harmonic characteristic in the first current.

13. The method of claim 12, further comprising:
combining the first and second currents to form an output current; and
supplying the output current to a non-linear electrical load.

14. The method of claim 12, wherein the first current and the second current are generated based on rotation of a same shaft including at least one permanent magnet.

15. The method of claim 12, wherein generating the first current includes generating a first multi-phase current,
generating the second current includes generating a second multi-phase current, and
a number of phases of the first multi-phase current is the same as a number of phases of the second multi-phase current.

16. The method of claim 12, wherein the second current is generated based on rotation of a shaft including a permanent magnet and magnetic flux generated by a control winding, and
a current to the control winding is modulated based on the monitoring the second current.

17. The method of claim 16, wherein modulating the current to the control winding comprises:
generating a control signal based on the monitoring the second current; and
modulating a current through an H-bridge to the control winding based on the control signal.

18. The method of claim 12, wherein generating the second current comprises:
generating an initial current with a first stator, based on a rotation of a permanent magnet; and
conditioning the initial current to with at least one of bi-directional switches and an inductor-capacitor filter to generate the second current.

* * * * *